United States Patent [19]
Bergey, Jr.

[11] 4,150,301
[45] Apr. 17, 1979

[54] WIND TURBINE

[76] Inventor: Karl H. Bergey, Jr., Rte. 1, Box 151-B, Norman, Okla. 73069

[21] Appl. No.: 802,727

[22] Filed: Jun. 2, 1977

[51] Int. Cl.² .............................................. F03D 9/00
[52] U.S. Cl. ......................................... 290/44; 290/55; 416/193 R; 416/DIG. 4
[58] Field of Search ...................... 290/44, 55; 416/40, 416/41, 44, 193 R, DIG. 4, DIG. 6

[56] References Cited

U.S. PATENT DOCUMENTS

| | | | |
|---|---|---|---|
| 1,531,370 | 3/1925 | Beavers | 290/55 |
| 2,126,202 | 8/1938 | McColly | 416/41 |
| 2,215,456 | 9/1940 | Albers | 416/41 |
| 2,278,247 | 3/1942 | Cullin | 290/55 |
| 4,110,631 | 8/1978 | Salter | 290/55 |

FOREIGN PATENT DOCUMENTS

| | | | |
|---|---|---|---|
| 127904 | 1/1948 | Australia | 416/203 |
| 2023 of | 10/1883 | United Kingdom | 290/44 |

*Primary Examiner*—Gene Z. Rubinson
*Assistant Examiner*—M. K. Mutter
*Attorney, Agent, or Firm*—Laney, Dougherty, Hessin & Beavers

[57] ABSTRACT

An improved fluid driven turbine blade system is provided, which is self-governing at relatively high fluid velocities. This is achieved by a combination of two sets of turbine blades, one having a positive efficiency, and the other having a negative efficiency at the fluid velocity at which the self-governing effect occurs. Also provided is a variable friction drive apparatus for powering an energy conversion device. The combination of the improved turbine blade system and the variable friction drive comprises a windmill for driving an electric generator, the windmill having a low required start-up torque at low wind speeds and being self-governing so as not to overspeed the generator at high speeds.

15 Claims, 7 Drawing Figures

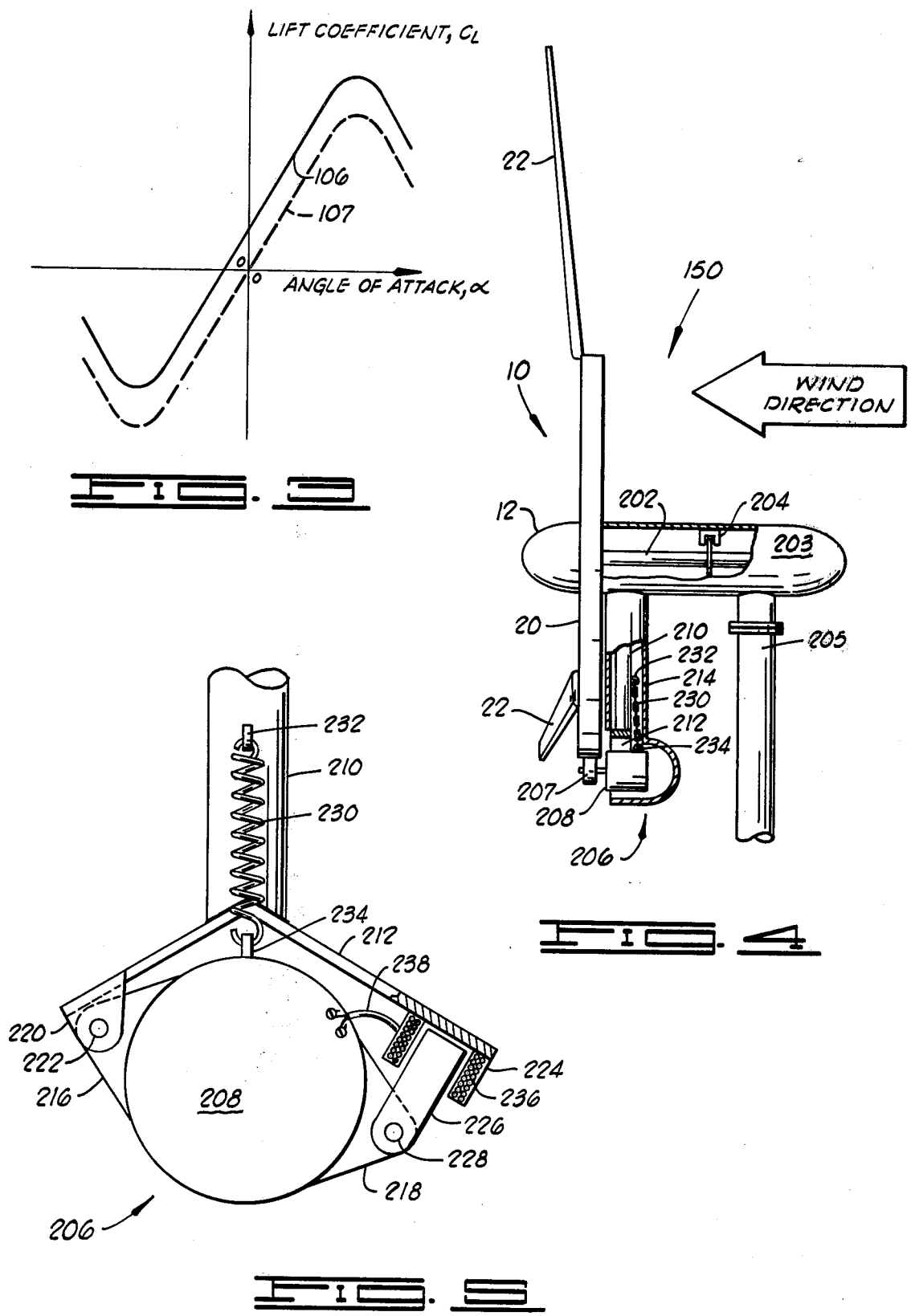

WIND TURBINE

BACKGROUND OF THE INVENTION

1. Field of the Invention

This invention relates generally to an improved blade design for fluid driven turbines, and more particularly, but not by way of limitation, to an improved windmill which includes a self-governing turbine blade system and an improved apparatus for coupling the turbine to an electric generator.

2. Description of the Prior Art

A major factor in the design of any fluid powered turbine is the velocity of the fluid. The fluid velocity must be high enough to overcome the static frictional forces in the turbine and initiate the rotary motion of the turbine. The fluid velocity must not be so high as to turn the turbine at a rotational speed higher than that for which it is designed. It is most desirable for the fluid velocity to be such that the turbine uses the available energy, in the moving fluid, as efficiently as possible. For a fluid turbine operating at a constant fluid velocity it is relatively simple to design the turbine to accommodate these considerations. It is much more difficult, however, to design a turbine which will operate satisfactorily over a wide range of fluid velocities.

One type of fluid powered turbine which is particularly subject to the problems of varying fluid velocity is the windmill. The fluid velocity, in this case the wind velocity, is entirely uncontrollable. The windmill is subject to wind velocities varying from zero, on a calm day, to perhaps one hundred miles per hour, in a raging storm. It is desirable that the wind velocity required to start the windmill be as low as possible so that the windmill will operate in a relatively light breeze. The windmill, however, must be designed to withstand the high winds of a hurricane or other storm; this generally requires that the windmill be governed in some manner to limit its rotational speed. Additionally, it is desirable that the windmill operate most efficiently at a wind velocity close to that of the average wind velocity of the locale.

Several devices for starting the windmill or assisting its operation at low wind velocities have been previously proposed. Cullin U.S. Pat. Nos. 2,159,886 and McDonald U.S. Pat. No. 2,086,279, disclose the utilization of an electric motor to start the windmill in operation at wind speeds high enough to keep the windmill in motion, but too low to overcome the initial resistance to motion.

U.S. Pat. No. 1,941,611 issued to Manikowske discloses the use of a coupling device, actuated by centrifugal force, which permits a turbine blade to be initially uncoupled from an electric generator, thereby reducing the windspeed required for start-up, and then upon the attainment of a predetermined rotational speed, the device couples the turbine blade to the generator.

The prior art has also included numerous devices for governing the speed of the turbine blade at high wind speeds. The Manikowske patent describes the use of a centrifugally actuated device which uncouples a turbine blade from an electric generator at a predetermined rotational speed so that the generator will not be oversped at high wind velocities. Halkias U.S. Pat. No. 1,483,301 teaches the use of an electrical feed-back circuit which senses whether the rotational speed is above or below a predetermined norm, and correspondingly actuates solenoid devices which adjust the turbine blades or vanes to reduce or increase the force exerted on the turbine blades by the wind. U.S. Pat. No. 1,334,385 issued to Clipfell, et al. teaches the use of a centrifugally operated device to automatically vary the pitch of the blades as the windspeed varies, so as to prevent overspeeding of the turbine in high winds.

U.S. Pat. No. 924,060 issued to Hards discloses the use of a spring loaded mounting of the turbine blades which permits the blades to yield and feather in a gust of wind, thereby preventing overspeeding of the turbine.

All of the previously proposed devices discussed above used rather complex apparatus to achieve low speed start-up and high speed governing. I have, however, invented an improved turbine blade system which will operate at low wind speeds and which is self-governing at high wind speeds without the use of any moving parts. This is accomplished by combining two sets of turbine blades. The first set of blades operates efficiently at relatively low wind speeds, but is less efficient at relatively high wind speeds. If driven at a rotational speed higher than some predetermined speed, the blades in this set will actually cease operating as a turbine and will begin pumping air against the direction of the wind movement. The second set of turbine blades is designed so as to be especially effective at relatively high wind speeds.

At very low wind speeds, the effect of the first set of blades is predominant, and the wind force exerted on those blades will cause the windmill to start turning. With increasing but relatively intermediate wind speed, both sets of blades act as turbines and the forces exerted thereon turn the windmill at ever increasing rotational speeds. At still higher wind speeds, above some predetermined, relatively high velocity, the effect of the second set of blades becomes predominant, and if unrestrained would continue to increase the rotational speed of the windmill above that for which it is designed. At this point, however, the first set of blades acts as a pump, pushing air in a direction opposite the direction of the natural wind movement, thereby lessening the energy input to the rotating windmill. At some given wind speed, the combined effects of the first and second sets of blades will be such that a constant maximum rotational velocity is achieved. Even if the wind speed further increases, the windmill will turn no faster.

Additionally, I have devised an improved variable friction generator drive system which further enhances the low speed start-up capabilities of my invention.

Devices are known which might initially appear superficially similar in their structural make-up, but upon more thorough inspection it is readily seen that those devices operate in a significantly different manner to achieve results entirely unlike those of the present invention. Thus, for example, Cullin U.S. Pat. No. 2,278,247 shows a wind turbine having two sets of blades. Both sets of blades are designed so as to act as turbines to turn a generator at the wind speeds for which it is designed, but there is no balancing effect between the two sets of blades acting to govern the speed of the turbine. Rotational speed of that device is governed only by varying the pitch of the outer set of blades. Furthermore, the inner set of blades in the Cullin structure are primarily for the purpose of directing air through the turbine to cool the electric generator located behind it.

U.S. Pat. No. 1,804,016 issued to Koenig shows another apparatus having two sets of blades. The Koenig apparatus is a propeller which is used to pump water or air and thereby drive a boat or an airplane. The inner set of blades was added to the Koenig device merely to increase the efficiency of the propeller along its radially inner portions where the outer set of blades was not very efficient. Both sets of blades act in the same manner, that is they both pump air, so that there is no balancing effect between the two sets of blades.

SUMMARY OF THE INVENTION

An improved fluid driven turbine blade system is provided, which is self-governing at relatively high fluid velocities. This is achieved by a combination of two sets of turbine blades, one having a positive efficiency, and the other having a negative efficiency at the fluid velocity at which the self-governing effect occurs. Also provided is a variable friction drive apparatus for powering an energy conversion device. The combination of the improved turbine blade system and the variable friction drive comprises a windmill for driving an electric generator, the windmill having a low required start-up torque at low wind speeds and being self-governing so as not to overspeed the generator at high speeds.

It is, therefore, a general object of the present invention to provide an improved turbine blade system for fluid driven turbines.

A further object of the present invention is to provide a turbine blade system which is self-governing above a predetermined fluid velocity; that is, the turbine blade system limits its rotational speed to some maximum value, regardless of increases in fluid velocity.

Another object is to provide an improved windmill incorporating the improved turbine blade system.

Yet another object of the present invention is to provide a windmill having a low required start-up torque, so that it will operate at low wind speeds.

Yet a further object is to provide an improved apparatus for driving an energy conversion device with a fluid driven turbine blade system.

Another object is to provide a variable friction drive system, which varies the frictional force between a driving turbine blade system and a driven generator as the speed of the turbine blade system varies.

A further object is to provide an integral RPM step-up from a turbine blade system to a driven generator without the use of an intermediate gear assembly.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 3 is a plot of angle of attack, $\alpha$, versus lift coefficient $C_L$, for a typical low speed blade.

FIG. 4 is a side elevational view of a windmill which includes the turbine blade system of FIG. 1.

FIG. 5 is a front (upwind) elevational view of the generator drive system of the windmill of FIG. 4.

DESCRIPTION OF THE PREFERRED EMBODIMENTS

Figure 1:
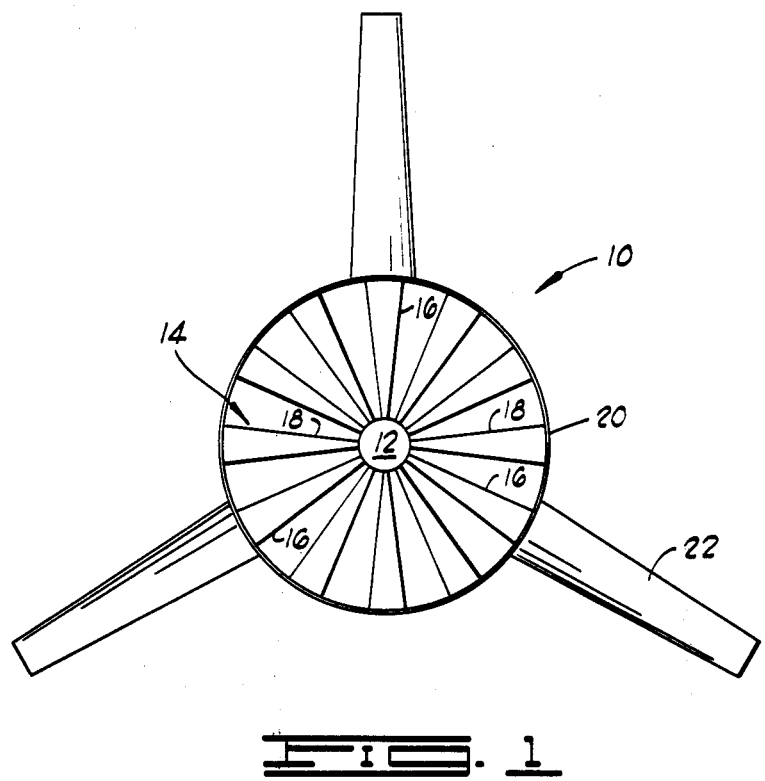
FIG. 1 is a front elevational view of my improved turbine blade system.

Referring now to the drawings, and particularly to FIG. 1, the turbine blade system of the present invention is illustrated and generally designated by the numeral 10. The turbine blade system 10 includes a central hub 12 to which are rigidly attached the radially inner ends of a plurality of blades comprising the inner low speed blade system, which is generally designated by the numeral 14. The low speed blade system 14 is comprised of three structural low speed blades 16 and nine non-structural low speed blades 18. The radially outer ends of all of the low speed blades 16 and 18 are rigidily attached to the inner circumference of a rim 20. The structural low speed blades 16 are arranged at intervals of 120° and the axial center line of each of the structural low speed blades 16 is approximately coincident with, and parallel to, an axial center line of one of three outer high speed blades 22. Each of the high speed blades 22 is rigidly attached to the rim 20. Aerodynamically, the low speed blades 16 and 18 are preferably substantially identical. The structural low speed blades 16, however, are physically stronger than the non-structural low speed blades 18. It is principally the three structural low speed blades 16 which transmit forces from the high speed blades 22 and the rim 20 to the hub 12.

The low speed blades system 14 is designed to have a maximum efficiency at relatively low fluid velocities, and to have a negative efficiency at relatively high fluid velocities. The high speed blades 22 are designed to have a maximum efficiency at relatively high fluid velocities. The efficiency of a blade is defined as the percentage of the total kinetic energy of the fluid incident upon the blade which is converted to kinetic energy in the rotating blade. The combination of the low speed blade system 14 and the high speed blades 22 comprises the turbine blade system 10 which is self-governing at relatively high fluid velocities, because the low speed blade system 14, due to its negative efficiency at those relatively high fluid velocities, will take energy away from the turbine blade system 10, while the high speed blades 22 will be adding energy, thereby resulting at some point in a net zero addition of energy which necessarily implies that the speed of the turbine will not further increase.

In other words, in this part of the operating range of the turbine blade system 10, as the fluid velocity increases, the energy added to the turbine blade system 10 by the high speed blades 22 will increase, and the energy removed from the turbine blade system 10 by the low speed blade system 14 will also increase. At some predetermined relatively high fluid velocity, the rate of increase in energy added by the high speed blades 22, with respect to the rate of increase in fluid velocity, will equal the rate of increase in energy removed by the low speed blade system 14, with respect to the rate of increase in fluid velocity, and the total energy in the turbine blade system 10 will become constant with increasing fluid velocities. The manner in which this is accomplished is more specifically described below.

Figure 2:
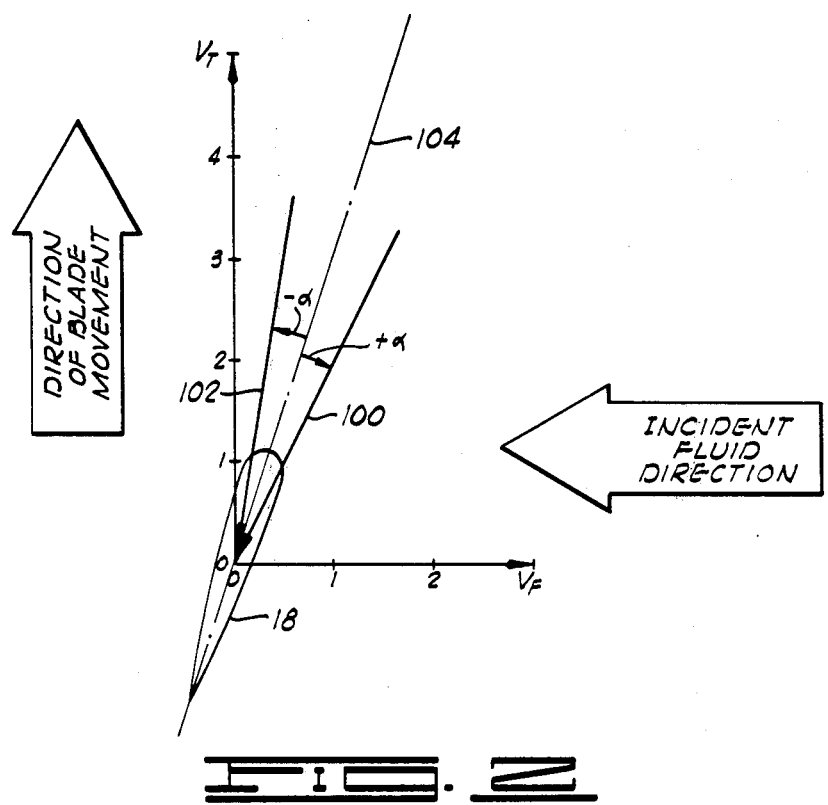
FIG. 2 is a cross-sectional view of a blade, showing superimposed thereon the resultant fluid velocity vectors for various tip speed ratios.

The negative efficiency phenomena of the low speed blade system 14 is achieved as follows. Referring now to FIG. 2, one of the low speed blades 18 is seen in cross-section. The actual cross-sectional shape of the blade 18 is not important at this point, and as will be seen later, the airfoil shape shown in FIG. 2 is in fact not the presently preferred embodiment of a low speed blade. The concept being illustrated here, however, is more easily visualized with reference to a symmetrical airfoil shape as shown in FIG. 2. FIG. 2 shows the orientation of the blade 18 with respect to the resultant fluid velocity at different tip speed ratios, X. The tip speed ratio, X, is defined as the ratio of the velocity of the blade tip, $V_T$, to the velocity of the incident fluid, $V_F$. The blade tip velocity $V_T$ equals the product of the rotational velocity of the blade in radians per unit time multiplied by the radial length of the blade. The rotational velocity of the blade is of course dependent upon the velocity of the incident fluid and the efficiency of the blade, and for positive blade efficiencies, the rotational speed will increase as the fluid velocity increases. The resultant fluid velocity relative to the tip of the blade 18 is the vector sum of the fluid velocity, $V_F$, and the blade tip velocity, $V_T$. The direction of this resultant vector varies with the tip speed ratio X. Note that to determine the resultant fluid velocity vector at some point radially inward of the blade tip, the blade tip velocity must be replaced by the analogous tangential velocity of that point on the blade.

For example, a relatively low speed resultant fluid velocity vector 100 occurs for $X=2.0$. A relatively high speed resultant fluid velocity vector 102 occurs for $X=6.0$. Note that the slope of the resultant fluid velocity vectors is equal to the ratio of $V_T$ to $V_F$, i.e., it is equal to X. The blade 18 is oriented so that its airfoil reference plane 104 is located between the two resultant fluid velocity vectors 100 and 102. For a given resultant fluid velocity vector, the angle of attack, $\alpha$, is defined as the angle between the airfoil reference plane 104 and the resultant fluid velocity vector. Angles of attack measured clockwise, as seen in FIG. 2, from the airfoil reference plane 104 are referred to as positive, $+\alpha$, and those measured counterclockwise are referred to as negative, $-\alpha$. It is seen in FIG. 2 that, for the blade orientation shown, $\alpha$ is positive for $X=2.0$, and $\alpha$ is negative for $X=6.0$.

FIG. 3 shows typical plots of the lift coefficient, $C_L$, versus the angle of attack, $\alpha$. The solid line curve 106 is a plot for a cambered airfoil shape, and the dashed line curve is a plot for a symmetrical airfoil shape. The lift coefficient, $C_L$, is proportional to the force exerted on the blade 18 by the incident fluid stream. For positive $C_L$, the fluid drives the blade 18 and adds energy to the turbine blade system 10. For negative $C_L$, the blade 18 pumps fluid in the direction opposite the incident fluid direction, thereby taking energy away from the turbine blade system 10. FIG. 3 shows that for both airfoil shapes, the value of $C_L$ becomes negative at certain values of negative $\alpha$. Combining the information from FIG. 2 and FIG. 3, the airfoil reference plane, as exemplified by the plane 104 in FIG. 2, may then be oriented so that for a predetermined relatively high fluid velocity and its corresponding resultant fluid velocity vector 102, the angle of attack will be sufficiently negative to provide the desired negative $C_L$.

This concept is more easily visualized when one thinks in terms of a non-rotating blade, e.g., the wing of an airplane. If the wing is placed in an airstream, that airstream is the equivalent of the resultant fluid velocity vectors discussed above. If the wing is initially oriented with its airfoil reference plane parallel to the airstream, the angle of attack is zero. Then, if the leading edge of the airfoil is raised relative to the trailing edge, the forces lifting the wing will increase. If, however, the leading edge is lowered, the lift coefficient will decrease and at some negative angle of attack it will become negative, that is, the wing will be pushed downward, rather than upward.

Referring now to FIG. 4, a side elevational view of a windmill generally designated by the numeral 150 is shown. The windmill 150 includes the turbine blade system 10. Specific embodiments of the low speed blades 16 and 18 and the high speed blades 22, designed to achieve the self-governing phenomena described above, are shown in FIG. 6.

Figure 6:
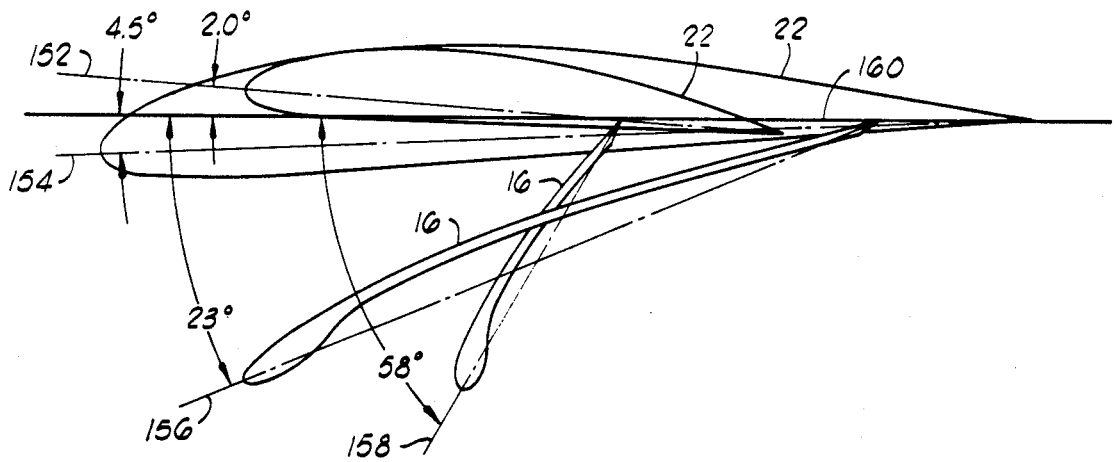
FIG. 6 schematically depicts the orientation of various cross-sections of the blades of the turbine blade system.

It must first be recognized, in discussing a blade shape and orientation for a windmill, that the direction of the resultant fluid velocity vector varies along the radial length of the blade, because for a given rotational speed, the tangential linear velocity of a point on the blade is proportional to its radial distance from the center of the blade. Therefore, to provide an optimum angle of attack along the entire length of the blade for a specific rotational velocity it is necessary that the orientation of the airfoil reference plane be varied. This gives the blades a "twisted" shape as is represented in FIG. 6. The amount of this twist, or the angle between the airfoil reference planes of the extreme inner and outer ends of a blade, depend upon the length of the blade.

One form of construction designed to achieve the results described above is comprised of a hub 12 which is ten inches in diameter, low speed blades 16 and 18 which are twenty-five inches in length, and high speed blades 22 which are forty-five inches long, making for a total diameter of the turbine blade system 10 of 150 inches. The ratio of the radius of the low speed blade system 14 to the radius of the turbine blade system 10 is equal to 0.4. As this ratio is increased, the relative dominance of the low speed blade system increases, lowering the speed at which the self-governing effect occurs. For the presently preferred embodiment, a ratio in the range of about 0.3 to 0.5 is selected. The high speed blades 22 have an NACA 4412 modified airfoil shape. The low speed blades 16 and 18 are thin plate blades which have been modified by the addition of a leading edge radius.

FIG. 6 shows the orientation of various cross-sections of the high speed blades 22 and the low speed blades 16 as viewed from the outer end of the high speed blades 22. The line 152 shows the orientation of the airfoil reference plane of the high speed blades 22 at their outer ends. The line 154 shows the orientation of the high speed blades 22 at their radially inner ends next to the rim 20. The line 156 shows the orientation of the airfoil reference plane of the radially outer ends of the low speed blades 16 adjacent the rim 20. The line 158 shows the orientation of the airfoil reference plane of the radially inner ends of the low speed blades 16 adjacent the hub 12. The orientation of the non-structural low speed blades 18 is similar to that of the structural low speed blades 16. The reference line 160 represents the plane of rotation of the turbine blade system 10. The plane of rotation 160 is perpendicular to the axis of rotation of hub 12.

Since the low speed blades 16 and 18, and the high speed blades 22, are fixedly attached to the central hub 12, they are said to have a fixed pitch. For purposes of this disclosure the pitch of a turbine blade is defined as the angle, at a given point on the blade, between its airfoil reference plane and the plane of rotation 160 of the turbine blade system 10.

For example, referring to FIG. 6, the radially inner ends of the low speed blades 16 have a pitch of 58° and the radially outer ends of the low speed blades 16 have a pitch of 23°. Due to the twisted structure of the blades this pitch varies along the radial length of each blade, but for any given radial position, the pitch remains constant regardless of the rotational speed of turbine blade system 10.

The term fixed pitch refers to a blade whose pitch is not varied during the time when the rotational speed of the turbine blade system 10 is changing. For example, U.S. Pat. No. 1,334,385 to Clipfell et al teaches the use of a centrifugally operated device to automatically vary the pitch of the blades as the windspeed varies; those blades are variable pitch blades.

By counter-example, however, U.S. Pat. No. 2,278,247 to Cullin teaches the use of radially outer blades 35, the pitch of which can be semi-permanently changed by loosening set screw 40, rotating the blade about its longitudinal axis, and then tightening set screw 40. This varying of the pitch of Cullin is not performed when the rotational speed of the turbine blade system is varying, but rather it must be done while the turbine blade system is motionless. The radially outer blades of Cullin therefore have a fixed pitch.

The choice of the specific airfoil shapes for the blades is, by itself, of little significance. The critical design feature is to choose the tip speed ratios at which it is desired to achieve maximum efficiency and to achieve the self-governing effect, and then to orient the blades of the chosen airfoil shape, so as to produce the efficiencies required to achieve these results.

Figure 7:
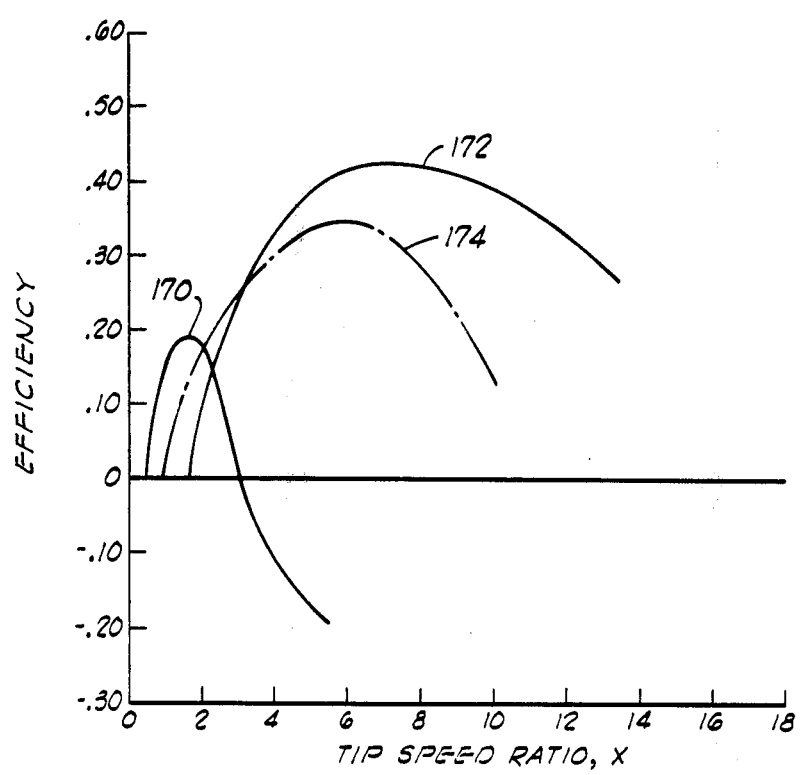
FIG. 7 graphically illustrates the efficiency of the improved turbine blade system.

The efficiency achieved by this specific embodiment is illustrated by FIG. 7. Curve 170 approximates the efficiency of the low speed blade system 14. Curve 172 approximates the efficiency of the three high speed blades 22. Curve 174 approximates the efficiency of the turbine blade system 10 which is a combination of the low speed blade system 14 and the high speed blades 22. Curve 170 shows that the low speed blade system 14 is designed to achieve a maximum efficiency at a tip speed ratio, X, of approximately 2.0 which occurs at relatively low wind speeds, and to achieve a negative efficiency at a tip speed ratio range of approximately 3.0. Curve 172 shows that the high speed blades 22 are designed to achieve a maximum efficiency somewhere within the tip speed ratio range of about 6.0 to 8.0, which occurs at relatively high wind speeds. FIG. 7 also indicates that the start-up speed of the turbine blade system 10 (curve 174) is lower than that of the high speed blades 22 (curve 172) and higher than that of the low speed blade system 14 (curve 170). The maximum efficiency of the combined turbine blade system 10 as shown by the peak of curve 174 will occur between the maximum efficiencies of either the high speed or low speed blades acting alone.

This maximum efficiency of the turbine blade system 10 is chosen to occur at a tip speed ratio corresponding to a wind speed which is somewhat above the average wind speed for the locale. Designing for maximum efficiency at such a wind speed takes advantage of the greater energy in the high winds since the energy taken from the wind is a cubic function of its velocity. The wind speed at which the turbine blade system 10 is designed to become self-governing is somewhat higher than the wind speed for which it is designed to achieve maximum efficiency. The average wind speed in the locale for which the preferred embodiment was designed is approximately 15 MPH; the wind speed at which the preferred embodiment achieves maximum efficiency is approximately 22 MPH, and the wind speed at which the preferred embodiment becomes self-governing is in the range of about 30 to 35 MPH. In general, the high speed blades may be designed to have a tip speed ratio which varies from about 4.0 to about 12.0.

Referring now to FIG. 4, a side elevation view of the windmill 150, including the turbine blade system 10, is shown. The turbine blade system 10 is mounted upon an axle 202 which is rotatingly mounted within a housing 203 by means of standard bearing blocks (not shown). A conventional disk brake assembly 204 is attached to the axle 202, so that the rotation of the turbine blade system 10 can be stopped when desired. The housing 203 is mounted upon the support column 205 which is firmly affixed to the earth.

The windmill 150 also includes a generator drive system which is generally designated by the numeral 206. The rim 20 engages a generator drive wheel 207, which drives an electric generator 208. In this view it is apparent that the high speed blades 22 are attached to the rear (downwind) edge of the rim 20 so as to make an acute angle with a diameter of the rim 20, thereby preventing interference of the high speed blades 22 with the generator drive wheel 207. The generator 208 is attached to the housing 203 by means of a support arm 210 and a mounting bracket 212. The generator 208, the support arm 210, and the mounting bracket 212 are all enclosed by means of the streamlined generator cover 214. It will be apparent to those skilled in the art that for purposes of powering the generator drive system 206, the rim 20, or its functional equivalent, need not be attached to both the low speed blades 16 and 18 and the high speed blades 22. For example, if both the low speed and high speed blades were attached to the central hub 12, then the rim 20 could be attached to either the low speed blades 16 and 18 or the high speed blades 22.

The mounting of the generator 208 is best shown in FIG. 5 which is a front view of the generator 208 with the cover 214 removed. The generator 208 includes a generator mounting ear 206 and a solenoid mounting ear 218. One end of the mounting bracket 212 includes a pair of ears 220. The generator 208 is pivotally attached to the bracket 212 by means of a mounting pin 222 inserted through the ears 220 and 216. The bracket 212 is rigidly attached to the support arm 210. A pancake solenoid 224 is mounted at the other end of the bracket 212. A solenoid plunger 226 is disposed within the solenoid 224. One end of the solenoid plunger 226 is pivotally attached to the solenoid mounting ear 218 by means of the solenoid mounting pin 228. A biasing spring 230 is connected between the mounting arm 210 and the generator 208 by means of the spring mounting ears 232 and 234.

The method of operation of the generator drive system 206 is as follows. The rim 20 drives the generator drive wheel 207 by means of the frictional force developed therebetween. This frictional force is dependent upon the normal force between those same two parts. It is desirable to have a relatively low frictional force between the rim 20 and drive wheel 207 when the windmill 150 is started. The lower that frictional force is, the lower will be the wind speed at which the turbine blade system 10 will begin to rotate. It is necessary, however, that there be sufficient frictional force to turn the generator 208. The normal force required to create this initial friction force is provided by the biasing spring 230. As the speed of the turbine blade system 10 increases, ever-increasing normal forces between the rim 20 and the drive wheel 207 are required to prevent slippage therebetween. This additional normal force is provided by means of the pancake solenoid 224. The generator 208 is electrically connected to the windings 236 of the solenoid 224 by the electrical connecting means 238. When the generator 208 is driven by the rim 20 and the drive wheel 207, a current generated thereby is transmitted to the windings 236 of the solenoid 224 by the electrical connecting means 238. This current energizes the solenoid 224 which creates a force which tends to pulls the solenoid plunger 226 into the solenoid 224. This causes the generator 208 to tend to pivot about the mounting pin 222 and increases the normal force between the rim 20 and the drive wheel 207. As the speed of the turbine blade system 10 continues to increase, the current generated by the generator 208 increases, and that increased current is passed through the solenoid 224 thereby further increasing the force between the rim 20 and the drive wheel 207. In this manner the frictional force between the rim 20 and the drive wheel 207 is automatically continuously varied according to the rotational speed of the turbine blade system 10. This allows the desired low friction at start-up and also provides the required higher friction at high speed.

Several desirable results are achieved by this design. As previously discussed, this permits the windmill to have a lower required starting torque, i.e., it starts up at lower wind speeds, than it otherwise would. Also the direct rim-to-generator drive eliminates the need for the step-up gearing which is used in most windmills which drive the generator from the axle 202. The drive ratio is easily changed by merely replacing the drive wheel 207 with one of a different diameter.

Another benefit is derived from the initially low normal force between the rim 20 and the drive wheel 207. The drive wheel 207 is preferably constructed from an elastomeric material. Such materials tend to take a semi-permanent set when subjected to static loads. The low normal force which exists when the windmill is not operating minimizes this problem.

It is also recognized that the variable friction drive system of the present invention could be adapted to drive energy conversion apparatus other than an electric generator. For example, a hydraulic or pneumatic pump could be driven by the drive wheel 207 and the solenoid 224 could be replaced by a hydraulic or pneumatic cylinder which is energized by the output of the pump. Such a construction is encompassed by the scope and spirit of this invention.

Thus, the fluid powered turbine of the present invention is well adapted to carry out the objects and attain the ends and advantages mentioned, as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A fluid driven turbine blade system which is self-governing at a given fluid velocity, comprising:
   a first blade means having a positive lift coefficient at the given fluid velocity, so that it then extracts energy from the fluid and adds kinetic energy to the turbine blade system; and
   a second fixed pitch blade means having a negative lift coefficient at the given fluid velocity, so that it extracts an amount of kinetic energy from the turbine blade system approximately equal to the amount of kinetic energy further added by the first blade means upon any increase in fluid velocity above said given fluid velocity, so that said turbine blade system is self-governing at said given fluid velocity.

2. A self-governing fluid driven turbine blade system comprising:
   a first blade means having a positive angle of attack at a predetermined rotational velocity; and
   a second fixed pitch blade means having a negative angle of attack at the predetermined rotational velocity, so that with increasing rotational velocities, an increase in kinetic energy added to the turbine blade system by the first blade means is offset by an equivalent increase in kinetic energy taken away from the turbine blade system by the second blade means, so that said turbine blade system is self-governing at said predetermined rotational velocity.

3. A fluid driven turbine blade system, comprising:
   a low speed fixed pitch blade means, having a maximum efficiency at relatively low fluid velocities, and having a negative efficiency at relatively high fluid velocities; and
   a high speed blade means, having a maximum efficiency at relatively high fluid velocities, so that at relatively low fluid velocities the total efficiency of the turbine blade system is greater than that of the high speed blade means, thereby permitting the turbine blade system to start up at a lower fluid velocity than would the high speed blade means alone, and so that at some given relatively high fluid velocity the low speed blade means extracts an amount of kinetic energy from the turbine blade system approximately equal to the amount of kinetic energy further added by the high speed blade means upon any increase in fluid velocity above said given relatively high fluid velocity, so that said turbine blade system is self-governing at said given relatively high fluid velocity.

4. The turbine blade system of claim 3 wherein the low speed blade means is so oriented as to have a negative angle of attack for tip speed ratios in excess of some predetermined relatively high tip speed ratio.

5. The turbine blade system of claim 3 which further comprises means connected to one of said blade means for driving an energy conversion apparatus.

6. The turbine blade system of claim 5, wherein said means for driving an energy conversion apparatus comprises a circular rim attached to one of said blade means.

7. The turbine blade system of claim 3, wherein:
   said low speed blade means includes a plurality of low speed fixed pitch blades, each of said low speed blades having a radially inner end and a radially outer end;
   said turbine blade system further includes a central hub, to which the radially inner ends of the low speed blades are attached, and a circular rim, to an inner circumference of which the radially outer ends of the low speed blades are attached; and
   said high speed blade means includes a plurality of high speed blades, each of said high speed blades having a radially inner end attached to the circular rim.

8. A windmill including the turbine blade system of claim 7, and which further comprises:
a drive wheel engaging said circular rim for driving an energy conversion apparatus; and
wherein the high speed blades are attached to an edge of the circular rim to define an acute angle with a diameter of the circular rim, thereby avoiding interference with the drive wheel.

9. The windmill of claim 8 wherein the low speed blades are modified thin plate blades having a leading edge radius, and are oriented to have a negative angle of attack for tip speed ratios in excess of 6.0.

10. The windmill of claim 9 wherein the low speed blades are further characterized as having a maximum efficiency at a tip speed ratio of approximately 2.0, and wherein the high speed blades are characterized as having a maximum efficiency within the tip speed ratio range of from about 4.0 to about 12.0.

11. The windmill of claim 10 wherein the ratio of the radial length of the low speed blades, as measured from the center of the central hub, to the overall radius of the turbine blade system is within the range of about 0.3 to 0.8.

12. In a windmill which includes an electric generator driven by a circular rim of a wind powered turbine, the improvement which comprises:
frictional drive means between the turbine and the generator, said drive means including a drive wheel engaging the circular rim;
spring means for providing a constant normal force between the rim and the drive wheel;
solenoid means, for directing the drive wheel into more forceful contact with the rim, to provide an additional normal force between the rim and the drive wheel; and
means for connecting an electric output of the generator to the solenoid means, so that a portion of the output of the generator is transmitted through the solenoid means, and the force provided by the solenoid means is continuously varied proportional to the output of the generator so that the additional normal force is increased as the turbine speed increases.

13. A windmill comprising:
a turbine blade system comprised of a central hub, a plurality of fixed pitch blades attached to the hub and extending radially outward therefrom, and a circular rim attached to the blades;
an electric generator;
a friction drive wheel attached to the electric generator, and engaging the circular rim;
solenoid means for urging the friction drive wheel into forceful contact with the rim; and
an electrical lead connecting an output of the generator to the solenoid, so that the force exerted by the solenoid is continuously varying and dependent upon the output of the generator.

14. The windmill of claim 13 which further comprises spring means for providing an additional constant force between the rim and the frictional drive wheel.

15. The windmill of claim 13 wherein the plurality of blades attached to the hub are further characterized as having a negative lift coefficient at a given fluid velocity, and which is further comprised of a plurality of high speed blades attached to the rim, extending radially outward therefrom, and having a positive lift coefficient at the given fluid velocity, so that the turbine blade system is self-governing at the given fluid velocity.

* * * * *